Feb. 14, 1961 E. P. ANDERSON 2,972,053
AIMING STAKE
Filed Oct. 14, 1957
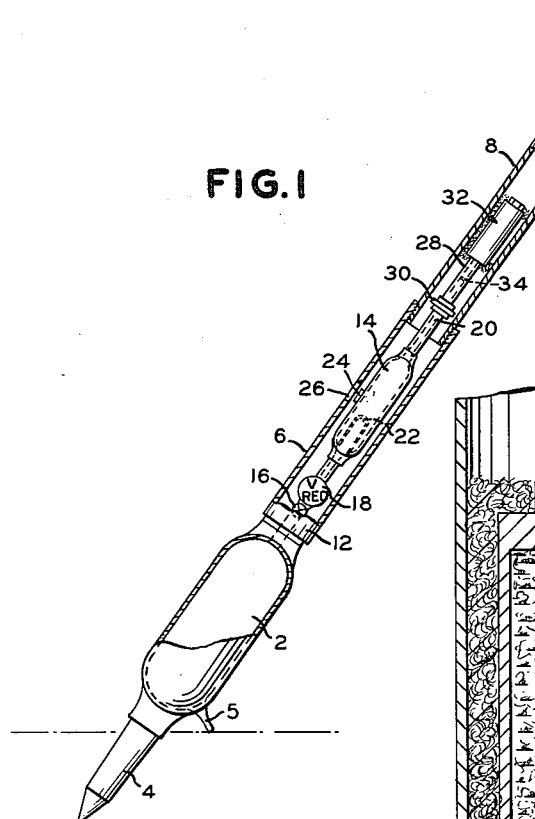
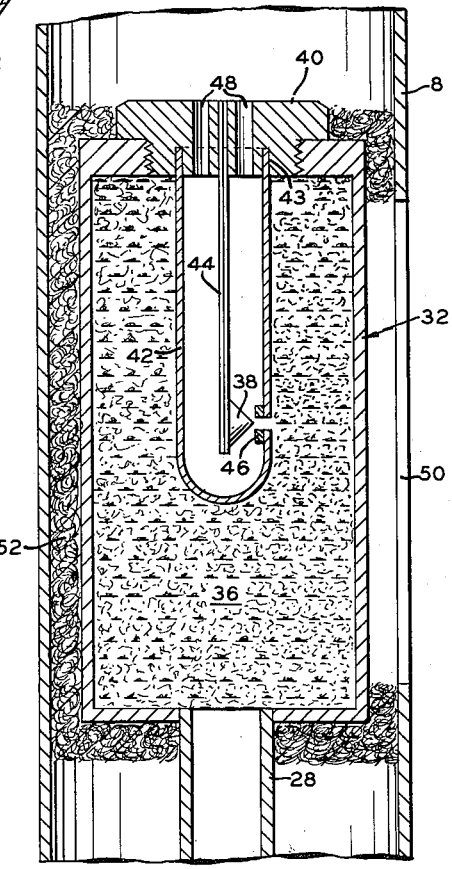
INVENTOR.
EDWARD P. ANDERSON
BY Karl Huber
James E. Bryan
ATTORNEY

2,972,053
AIMING STAKE

Edward P. Anderson, Livingston, N.J., assignor, by mesne assignments, to Engelhard Industries, Inc., Newark, N.J., a corporation of Delaware Filed Oct. 14, 1957, Ser. No. 690,153

9 Claims. (Cl. 250—85)

This invention relates to an aiming stake to be used in connection with detecting devices sensitive to infra-red radiation and, more particularly, is concerned with a self-contained aiming stake for artillery which includes all the components necessary for the emission of infrared radiations.

The aiming stake according to the present invention comprises a source of an oxygen-fuel mixture which is passed into a combustion chamber containing a catalyst. A flameless combustion takes place within this chamber, thereby heating the walls of the chamber to a predetermined temperature, suitably about 200° F., thus producing an infra-red radiation through the chamber walls.

According to a preferred embodiment of the invention, a reservoir of a compressed oxygen-containing gas, usually compressed air, is connected to a tubular housing which encloses the components of the device through which the gas flows, finally reaching the combustion chamber.

In the accompanying drawing, one embodiment of the invention will be further illustrated, wherein Figure 1 is a view in elevation, partly broken away, of the aiming stake, and Figure 2 is a detailed sectional view through the combustion chamber and the valve which controls the gas flow.

As shown in Figure 1, the reservoir 2 is provided with a pointed projection 4 which, when driven into the ground, maintains the aiming stake in an essentially vertical position at any desired location. Through a valve 5, which may be similar to the type used on automobile tire tubes, the reservoir 2 can be filled from a compressed air or oxygen cylinder or by means of a tire pump or the like.

At the end of the reservoir 2, opposite to the spike 4, a tubular housing is attached which consists preferably of two sections of pipe 6 and 8, the pipe 6 being internally threaded at both ends, these threads cooperating with the corresponding external threads of the container 2 and the pipe 8. Thus, the housing has the form of a stake which is readily assembled or disassembled.

The tubing 12 conducts the compressed air from the tank 2 into the fuel reservoir 14, the air passing through an on-off valve 16 and a reducing valve 18, the latter reducing the pressure of the compressed air from about 2,000 pounds to about 10 pounds per square inch gauge. Generally, the on-off valve 16 is operated by a removable key which is inserted through an opening in the pipe 6 facing the valve.

The fuel reservoir 14 contains a filling of cotton, or the like, saturated with a fuel, such as methyl alcohol, or acetone, the vapor of which in admixture with the oxygen supplied from the container 2, forms a catalytically combustible mixture. The inlet end of the reservoir 14 has a perforated tubular retaining member 22 therein which prevents the cotton or other fibrous filling from slipping into the valve 18 and insures equal distribution and intimate contact between the compressed air and the fuel. A filling plug 24, accessible through an opening 26 in the pipe 6, is used to supply fuel to the reservoir 14.

The air-fuel mixture flows through the tubings 20 and 28, joined by a flange connection 30, into the combustion chamber 32, the tubing 28 having a fine wire gauze 34 inserted therein which serves as a flashback arrestor, thus insuring safe operation of the device.

Figure 2 shows the construction of the combustion chamber 32 in detail. The air-fuel mixture entering through the tubing 28 contacts the catalyst 36, consisting of platinum metal on asbestos as a carrier, for example, and a flameless combustion occurs. In order to maintain the temperature of the outside walls of the combustion chamber constant, a valve 38 is mounted inside of a hollow plug which consists of a nut 40 and a tubular member 42 which is inserted into a circular groove 43 in the nut, the tubular member 42 protruding into the combustion chamber and the plug, as a whole, forming one end closure for the combustion chamber. The valve 38 is mounted upon the free end of a bi-metal strip 44 affixed to the nut 40 and operates to maintain a constant temperature. When a predetermined temperature limit, e.g. about 200° F., is attained, the valve 38, in cooperation with the valve seat 46 in the tubular member 42 closes the outlet of the combustion chamber and the supply of air-fuel mixture ceases to enter due to the pressure in the chamber 32. As the bi-metal strip 44 cools, the valve 46 opens and more air-fuel mixture flows into the combustion chamber, the products of combustion being vented to the atmosphere through the bores 48 in the nut 40, and a window 50 provided in the housing pipe 8.

By mounting the thermostatically-controlled valve inside the combustion chamber, the most accurate operation of the valve, independent of the outside temperature, is obtained and undesirable heat losses can be reduced by imbedding the combustion chamber in a suitable insulating material 52 such as glass wool, or the like.

The outer surface of the combustion chamber 32 consists preferably of black nickel, or the like, to increase infra-red radiation, the window, or windows 50 in the pipe 8 facing the black surface.

According to a modification of the invention, a gaseous fuel may be used. In this case, the fuel reservoir does not contain any fibrous filling, but is provided with a suitable bleeder to insure the desired ratio of mixture with an oxygen-containing gas. Further, the reservoir 2 can be filled with a compressed gaseous fuel which, as it passes through the aiming stake, draws in atmospheric air in a manner similar to that employed in gas burners, whereby no second reservoir is required.

It will be obvious to those skilled in the art that many modifications may be made within the scope of the present invention without departing from the spirit thereof, and the invention includes all such modifications.

What is claimed is:

1. A self-contained portable aiming stake for marking an unknown location by infrared radiation from said location comprising an elongated housing, a spike attached to the housing for maintaining the aiming stake in a desired position when driven into the ground, a reservoir for compressed gas secured to the housing, a catalytic combustion chamber mounted in the housing, and means for supplying a combustible mixture from said reservoir to the combustion chamber, the housing having at least one infrared radiation transmissive window arranged to face the combustion chamber.

2. A self-contained portable military aiming stake for marking an unknown location by infrared radiation from said location, comprising a tubular housing, a catalytic combustion chamber mounted in said housing, a fuel reservoir connected to said combustion chamber, means for adjustably supplying a combustible mixture from said fuel reservoir to the combustion chamber and means for directing infrared radiation to the exclusion of visible radiations in a particular direction from the aiming stake.

3. In a self contained portable aiming stake for marking an unknown location by infrared radiation from said location, a tubular housing, a catalytic combustion chamber mounted in and substantially adjacent one end of said housing, a fuel reservoir connected to said combustion chamber, another reservoir for a compressed, oxygen-containing gas attached to the housing at the end opposite the combustion chamber and connected to the fuel reservoir, a spike attached to one of said reservoirs for maintaining the aiming stake in a desired position when driven into the ground, said housing having at least one infrared radiation transmissive window arranged to face the combustion chamber.

4. In a self-contained portable aiming stake, an elongated housing, a fuel reservoir secured to said housing, a combustion chamber mounted in the housing, means for supplying a combustible mixture from said reservoir to said combustion chamber, control means for maintaining the walls of said combustion chamber at a temperature of the order of magnitude of 200° F. where strong infrared and essentially no visible radiations are produced, means for directing infrared radiation signals through said housing in a predetermined direction with respect to said housing, and means for securely mounting said housing on the surface of the earth at a desired orientation with respect to the earth.

5. An assembly comprising a housing, an infrared combustion chamber mounted within said housing, a fuel reservoir secured to said housing, a window on one side of said housing for directing infrared radiations from said housing, and a spike attached to said housing, for mounting the assembly in the ground.

6. In an aiming stake, an elongated housing, an infrared combustion chamber mounted within said housing, a fuel reservoir secured to said housing, a window on one side of said housing for directing infrared radiations from said housing, and a spike attached to said housing for mounting the stake in the ground.

7. In a self-contained portable aiming stake, a supporting structure, an infrared radiation surface mounted on said supporting structure, means for heating said radiation surface, a source of energy for said heating means mounted on said supporting structure, control means for maintaining said surface at a temperature of the order of magnitude of 200° F. where strong infrared and essentially no visible radiations are produced, means for aiming the infrared radiations in a predetermined direction from said structure, and pointed means for securing the complete aiming stake structure in the earth.

8. In a military equipment for marking an unknown location by infrared radiation from said location, a portable self-contained radiation source including a heat-resistant surface, catalytic combustion means for continuously maintaining said surface at infrared radiation temperature and means for directing infrared radiation in a particular direction from said surface.

9. In a military equipment for marking an unknown location by infrared radiation from said location, a portable self-contained radiation source including a catalytic combustion chamber, a fuel reservoir connected to said combustion chamber, means for supplying a combustible mixture from said reservoir to the combustion chamber, and a spike secured to said radiation source for maintaining it in a desired position when driven into the ground.

References Cited in the file of this patent

UNITED STATES PATENTS

| | | |
|---|---|---|
| 1,452,792 | Cooper | Aug. 24, 1923 |
| 2,407,729 | Taylor | Sept. 17, 1946 |

FOREIGN PATENTS

| | | |
|---|---|---|
| 808,152 | France | Nov. 6, 1936 |